US005916680A

United States Patent [19]

Wakata et al.

[11] Patent Number: 5,916,680

[45] Date of Patent: Jun. 29, 1999

[54] THERMORESPONSIVE MICROCAPSULE, HEAT SENSITIVE RECORDING MATERIAL AND MULTICOLOR HEAT SENSITIVE RECORDING MATERIAL

[75] Inventors: Yuichi Wakata; Kimio Ichikawa, both of Shizuoka-ken, Japan

[73] Assignee: Fuji Photo Film Co., Ltd, Kanagawa, Japan

[21] Appl. No.: 08/944,238

[22] Filed: Oct. 6, 1997

[30] Foreign Application Priority Data

Oct. 9, 1996 [JP] Japan .................................... 8-268721

[51] Int. Cl.[6] ................................ B01J 13/02; B41M 5/34

[52] U.S. Cl. ................................ 428/402.21; 428/402.22; 264/4.1; 264/4.3; 264/4.33; 264/4.7; 427/148; 427/149; 427/150; 430/56; 430/61; 430/154

[58] Field of Search ............................ 428/402.2, 402.21, 428/402.22; 264/4.1, 4.3, 4.33, 4.7; 427/148, 149, 150; 430/56, 61, 154

[56] References Cited

U.S. PATENT DOCUMENTS 4,517,141 5/1985 Dahm et al. ............................. 264/4.7

*Primary Examiner*—Nathan M. Nutter
*Attorney, Agent, or Firm*—Sughrue, Mion, Zinn, Macpeak & Seas, PLLC

[57] ABSTRACT

A thermo-responsive microcapsule containing a diazo compound or an electron donative dye precursor, wherein the capsule wall of the microcapsule is composed of at least one polymer obtained by polymerization of an isocyanate compound containing an adduct of (A) a compound having one active hydrogen in the molecule and having an average molecular weight from 500 to 20000 and (B) a multifunctional isocyanate having two or more isocyanate groups in the molecule, and a heat-sensitive recording material and a multicolor heat-sensitive recording material comprising a heat-sensitive recording layer containing the microcapsule are disclosed.

20 Claims, No Drawings

THERMORESPONSIVE MICROCAPSULE, HEAT SENSITIVE RECORDING MATERIAL AND MULTICOLOR HEAT SENSITIVE RECORDING MATERIAL

BACKGROUND OF THE INVENTION

1. Field of the Invention

The present invention relates to a thermo-responsive micro-capsule which can be applied for a heat-sensitive recording material, and a heat-sensitive recording material and a multicolor heat-sensitive recording material using the microcapsule.

2. Description of the Related Art

A heat-sensitive recording material in which a solid dispersion of an electron donative dye precursor is coated and dried, on a substrate and is widely used as a recording medium for a facsimile, a printer or the like. A recording method using an electron donative dye precursor is advantageous because raw materials are easily available and high color developing density and color developing speed are manifested. However, this method is disadvantageous because color easily develops due to storage conditions after recording, heat or adhesion of a solvent and the like. Accordingly, there are problems in storability and reliability of a recorded image, and, improvements therefor have been studied.

As a method for improving storability of a recorded image there is suggested a method in which storability of an image is enhanced by encapsulating an electron donative dye precursor and isolating the dye precursor from a color developing agent in a recording layer. By this method, a high color developing ability and image stability can be obtained.

As a heat-sensitive recording material other than the above-described material, a so-called diazo type heat-sensitive recording material is also studied using a diazonium salt compound. This diazonium salt compound reacts with a phenol derivative, a compound having an active methylene group (coupler) and the like to form a dye. However, the diazonium salt compound loses its activity by irradiation of light since the compound has also a photo-sensitivity simultaneously. By utilizing these characteristics, a diazonium compound is recently applied also to a heat-sensitive recording material, and a photo-fixing type heat-sensitive recording material by which an image is formed by allowing to react a diazo compound with a coupler by heating, followed by fixing by irradiation with light is suggested (K. Sato et al., "Bulletin of the Society of Image and Electron", vol. 11, (4), 290–296 (1982), and the like).

However, since a recording material using a diazonium salt compound has a high chemical activity, there is a drawback that the diazonium compound and a coupler gradually react with each other even at a low temperature, and consequently storage life (shelf life) thereof is short. As a means to solve this drawback, there is suggested a method in which a diazonium salt compound is encapsulated in a microcapsule to be isolated from a coupler, water and a basic compound (T. Usami et al., "Bulletin of the Society of Electrophotography", vol. 26, (2), 115–125 (1987)).

Further, as an application of a heat-sensitive recording material, a multi-color heat-sensitive recording material comes into notice. It has been said that reproduction of multi-color images by heat-sensitive recording as compared with an electrophotographic recording method or an ink jet recording method is difficult. However, it has already been known that a multi-color heat-sensitive recording material can be obtained by layering, on a substrate, two or more of heat-sensitive color forming layers containing, as main component, an electron donative dye precursor and a color developing agent, or a heat-sensitive color forming layer containing a diazonium salt compound and a coupler which reacts with the diazonium salt compound by heating to form a color.

In a multi-color heat-sensitive recording material, it is essential to precisely control heat developing characteristics of a microcapsule to achieve an excellent color reproduction.

Conventionally, in order to encapsulate an electron donative dye precursor and a diazonium salt compound in a microcapsule, these compounds are generally dissolved in an organic solvent (oil phase) and this phase is added to an aqueous solution of a water-soluble polymer (water phase) to be emulsified and dispersed. In this procedure, by adding a monomer or a prepolymer which becomes a wall material to the organic solvent phase or the water phase previously, a polymer wall can be formed on the interface between the organic solvent phase and the water phase to make a microcapsule. This method is described in detail in "Microcapsule" (A. Kondo, Nikkan Kogyo Shimbun (Daily Industrial Newspaper K.K.) (1970)) and "Microcapsule" (Y. Kondo et al., Sankyo Publishing K.K. (1977)). As a material for the microcapsule wall to be formed, various materials can be used such as gelatin, alginate, cellulose, polyurea, polyurethane, melamine resin, nylon and the like. Polyurea and urethane resins are suitable for designing a heat-sensitive recording material since the glass transition temperature thereof is from room temperature to about 200° C. and the resulting capsule wall shows thermo-responsibility.

In the case of a microcapsule having a polyurethane or polyurea wall, for producing the microcapsule, there is conventionally known the following method. First, a diazonium salt and an electron donative dye precursor are dissolved in an organic solvent. To this solution is added a multifunctional isocyanate compound, and the resulting organic phase solution is emulsified in a water-soluble polymer aqueous solution. Then, a catalyst which promotes polymerization reaction is added to the water phase or the temperature of the emulsion is raised to polymerize the multifunctional isocyanate compound with a compound having an active hydrogen such as water and the like, to form a capsule wall.

As the multifunctional isocyanate compound which is a forming material for a polyurea or polyurethane wall, an adduct of 2,4-tolylene diisocyanate with trimethylolpropane and an adduct of xylene diisocyanate with trimethylolpropane are, for example, mainly used (Japanese Patent Application Laid-Open (JP-A) Nos. 62-212190, and 4-261893).

However, even the above-described capsule wall made of polyurea or polyurethane using the multifunctional isocyanate compound does not sufficiently improve the above-described short shelf life when the diazonium salt compound is used. Namely, if the heat-sensitive recording material which does not have sufficiently long shelf life is exposed, for example, to high temperature and high humid conditions during period between the production and use thereof, color formation of the ground called "fog" is manifested, and visual identification ability of the resulting printed image deteriorates.

To solve such a problem, for example, the wall of a microcapsule is thickened, and the like. However, when such a method is used, color developing sensitivity in thermal printing lowers.

Therefore, further improvements on shelf life while maintaining a high color developing ability are extremely difficult.

To solve such a problem, there is known, f or example, a method in which a part of a multifunctional isocyanate compound is allowed to react with a monoalcohol compound previously before use, as described in Japanese Patent Application Laid-Open (JP-A) No. 5-317694. However, since specific monoalcohol used in this case is a compound having 2 to 9 carbon atoms, when ratio of use of the alcohol is raised, though sensitivity thereof increases, fog also increase. On the contrary, when ratio of use of the alcohol is reduced, though fog can be prevented, effect of increase in sensitivity is insufficient.

Further, the above-described multicolor heat-sensitive recording material comprises heat-sensitive recording layers for forming cyan, magenta and yellow colors, respectively, and each layer is heated at different temperatures for printing. Therefore, excellent thermo-responsiveness is further required as compared with the heat-sensitive recording layer of a usual heat-sensitive recording material. It cannot be said that the wall of the above-described conventional polyurea and polyurethane capsule wall fully satisfies these requirements.

A heat-sensitizer for improving heat sensitivity can further be added into the heat-sensitive color forming layer of a heat-sensitive recording material. As the heat sensitizer, p-toluenesulfonamide described in Japanese Patent Application Publication (JP-B) No.6-55546 and the like are known to exhibit excellent performance. However, as a compound having further excellent performance, there is listed an arylsulfonamide compound having a specific substituent described in Japanese Patent Application Laid-Open (JP-A) No. 9-39389. In a multi-color heat-sensitive recording material, it is necessary to emulsify the above-described arylsulfonamide compound before use to reduce haze in the above-described heat-sensitive color forming layer. Methods for emulsification are not particularly limited, and conventional known methods can be used. Specifically, the above-described arylsulfonamide compound is dissolved in an organic solvent which is slightly soluble or insoluble in water, the solution is mixed with a water phase containing a surfactant and/or water-soluble polymer as a protective colloid, and is stirred to prepare a emulsified dispersion. This emulsified dispersion is described in detail in Japanese Patent Application Laid-Open (JP-A) No. 2-141279.

However, since the heat sensitizer is usually a crystalline substance, an emulsified material containing the sensitizer sometimes causes problem that crystals of the sensitizer are deposited with a lapse of long period of time and the like. Accordingly, it has been desired that a microcapsule which manifests sufficient heat sensitivity without using the above-described heat sensitizer or using a small amount of the sensitizer is developed.

SUMMARY OF THE INVENTION

The present inventors have intensively investigated especially regarding a microcapsule wall forming material, among investigations regarding the kind, addition method and the like of the core forming material of a microcapsule such as an electron donative dye precursor and a diazonium salt compound, the microcapsule wall forming material, surfactant and the like, in order to improve shelf life with maintaining high color forming ability or to obtain the above-described color forming ability which can satisfy highly controllable heat color forming characteristics of a microcapsule required in a multicolor heat-sensitive recording material, and have accomplished the present invention.

An object of the present invention is to provide a thermo-responsive microcapsule which manifests high color forming ability by bringing the microcapsule into contact with a coupler or a color developing agent which can suitably used in a heat-sensitive recording material and an multicolor heat-sensitive recording material, or manifests sufficient color forming ability with using a small amount of a heat sensitizer or without using heat sensitizer, and is excellent in storability before use.

Another object of the present invention is to provide a heat-sensitive recording material which has a high sensitivity, high color forming ability and excellent storability before use (long shelf life).

Still another object of the present invention is to provide a multicolor heat-sensitive recording material which has a high sensitivity, color reproducing ability and excellent storability before use.

The present invention relates to a thermo-responsive microcapsule containing a diazo compound or an electron donative dye precursor, wherein the capsule wall of the microcapsule is composed of at least one polymer obtained by polymerization of an isocyanate compound containing an adduct of (A) a compound having one active hydrogen in the molecule and having an average molecular weight from 500 to 20000 with (B) a multifunctional isocyanate having two or more isocyanate groups in the molecule.

The present invention also relates to a heat-sensitive recording material comprising a substrate and a heat-sensitive recording layer, disposed on the substrate, including a coupler and a microcapsule containing a diazo compound, or a color developing agent and a microcapsule containing an electron donative dye precursor, wherein the microcapsule is the above-described thermo-responsive microcapsule. The present invention also relates to a multicolor heat-sensitive recording material comprising a transparent substrate and heat-sensitive recording layers capable of forming cyan, magenta and yellow colors, respectively, disposed on the substrate, wherein each recording layer includes a coupler and a microcapsule containing a diazo compound, or a color developing agent and a microcapsule containing an electron donative dye precursor, wherein at least one type of the microcapsules is the above-described thermo-responsive microcapsule.

DESCRIPTION OF THE PREFERRED EMBODIMENTS

The above-described (A) a compound having one active hydrogen in the molecule and having an average molecular weight from 500 to 20000 will be described below.

As the functional group having an active hydrogen, a hydroxyl group, amino group, carboxyl group and the like are listed. Among them, a hydroxyl group and an amino group are particularly preferred.

Such a compound having an active hydrogen and having a molecular weight from 500 to 20000 is not particularly restricted, and the examples thereof include polyether, polyester, polyamide, polyurea, polyurethane, polysiloxane, the polymer obtained by polymerization of vinyl monomer (hereinafter, referred to as a vinyl polymer) having an active hydrogen on one end, and the like. Among them, polyether, polyester, polysiloxane and vinyl polymer are preferred from the viewpoint of solubility of a compound in encapsulation.

When the molecular weight is less than 500, fog increases by introduction of this compound. On the other hand, when the molecular weight exceeds 20,000, synthesis of the compound is difficult and the compound has a high viscosity, therefore, solution preparation when encapsulation is conducted and capsule formation are difficult.

More specific examples of polyether include polyethylene oxide, polypropylene oxide, polytetramethylene oxide, polystyrene oxide, polycyclohexylene oxide, poly (ethylene thioglycol) and the like. As a polyester, polycaprolactone and the like are exemplified.

These compound are obtained, for example, by ring-opening and polymerizing a cyclic compound such as ethylene oxide, propylene oxide and the like using alcohol, alkoxide, carboxylic acid, carboxylate and the like as a polymerization initiation end, or obtained as a polyether or polyester having a hydroxyl group on one terminal end from a caprolactone and the like using alcohol, alkoxide and the like as a polymerization initiation end. Also, this terminal end hydroxyl group can be substituted by an end amino group, carboxyl group and the like by a known method.

Further, there can also be utilized a compound in which one active hydrogen of a polyether or a polyester having active hydrogens on both terminal ends is substituted by an ether group or an ester group.

As a polysiloxane, for example, polydimethylsiloxane derivatives and the like having a hydroxyl group on one end thereof can also be used.

Further, vinyl polymers (for example, poly (meth) acrylate, polystyrene, poly (meth) acrylamide and the like) can be utilized.

Such a compound is obtained, for example, as a vinyl polymer having a hydroxyl group or a carboxyl group on one end thereof by radical polymerization of a vinyl-based monomer in coexistence of a radical polymerization initiator and a mercapto compound such as mercapto ethanol, mercapto acetic acid and the like. Further, these functional groups can be optionally substituted by an amino group and the like using a known reaction. The examples of the vinyl polymerization type monomer include (meth) acrylates, for example, methyl (meth) acrylate, ethyl (meth) acrylate, propyl (meth) acrylate, isopropyl (meth) acrylate, butyl (meth) acrylate, hexyl (meth) acrylate, cylcohexyl (meth) acrylate, 2-ethylhexyl (meth) arylate, octyl (meth) acrylate, chloroethyl (meth) acrylate, allyl (meth) acrylate, 2-hydroxyethyl (meth) acrylate, 2-hydroxypropyl (meth) acrylate, benzyl (meth) acrylate, phenoxyethyl (meth) acrylate, phenyl (meth) acrylate, naphthyl (meth) acrylate and the like: (meth) acrylamides, for example, (meth) acrylamide, N-alkyl (meth) acrylamide (examples of alkyl group include a methyl group, ethyl group, propyl group, butyl group, t-butyl group, octyl group, ethylhexyl group, cyclohexyl group, hydroxyethyl group, benzyl group and the like), N-aryl (meth) acrylamide (examples of aryl group include aphenyl group, naphthyl group, hydroxyphenyl group and the like), N,N-dialkyl (meth) acrylamide (examples of alkyl group include a methyl group, ethyl group, butyl group, isobutyl group, ethylhexyl group, cyclohexyl group and the like), N,N-diaryl (meth) acrylamide (examples of aryl group include a phenyl group and the like), N-methyl-N-phenyl (meth) acrylamide, N-hydroxyethyl-N-methyl (meth) acrylamide and the like: vinyl esters, for example, vinyl acetate, vinyl butyrate, vinyl isobutyrate, vinyl acetacetate, vinyl benzoate and the like: styrenes, for example, styrene, methylstyrene, dimethylstyrene, ethylstyrene, isopropylstyrene, butylstrene, hexylstyrene, chloromethylstyrene, trifluoromethylstyrene, ethoxymethylstyrene, methoxystyrene, dimethoxystyrene, chlorostyrene, dichlorostyrene, bromostyrene and the like: (meth) acrylonitrile, (meth) acrylic acid, polyvinylmethyl ether and the like.

These compounds may be a compound composed of one kind of a repeating unit, or a compound composed of two or more kinds of repeating units.

Further, these compounds may have melting points. In this case, a compound having a melting point especially from 40 to 180° C. is preferred. Examples of the compound having such a melting point include polyethylene oxide, polystyrene oxide, polycaprolactone and the like. Though it is not always applicable since melting point varies with molecular weight, polyethylene oxide, for example, having a molecular weight of about 1000 or more, has a melting point in the above range.

Among them, preferred examples include monoethers of polyethylene oxide and polypropylene oxide (examples of the monoether include monomethyl ether, monoethyl ether, monooleyl ether, monolauryl ether, monostearyl ether, monononylphenyl ether, monooctylphenyl ether, monolanolin alcohol ether and the like), monoesters of polyethylene oxide and polypropylene oxide (examples of the monoester include monoacetate, mono (meth) acrylate, monooleate, monolaurate, monostearate, monolanolin aliphatic acid esters and the like), polycaprolactone and the like, and the particularly preferable examples include monoethers and monoesters of polyethylene oxide.

The above-described (B) a multifunctional isocyanate having two or more isocyanate groups in the molecule will be described below. Among such compounds, examples of the compound having two isocyanate groups in the molecule include m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-dimethoxy-biphenyl diisocyanate, 3,3'-dimethyldiphenylmethane-4,4'-diisocyalante, xylylene-1,4-diisocyanate, xylylene-1,3-diisocyanate, 4-chloroxylylene-1,3-diisocyanate, 2-methylxylylene-1,3-diisocyanate, 4,4'-diphenylpropane diisocyanate, 4,4'-diphenylhexafluoropropane diisocyanate, trimethylene diisocyanate, hexamethylene diisocyanate, propylene-1,2-diisocyanate, butylene-1,2-diisocyanate, cylcohexylene-1,2-diisocyanate, cyclohexylene-1,3-diisocyanate, cyclohexylene-1,4-diisocyanate, dicyclohexylmethane-4,4'-disocyanate, 1,4-bis (isocyanate methyl) cyclohexane and 1,3-bis (isocyanate methyl) cyclohexane, isophorone diisocyanate, lysine diisocyanate and the like. Further, adducts of these bifunctional isocyanate compounds with bifunctional alcohols and phenols such as ethylene glycols, bisphenols and the like can also be used.

Further, multifunctional isocyanate compounds can also be used. The examples of these compounds include trimers (buret or isocyanurate) using as a main raw material the above-described bifunctional isocyanate compounds, multifunctional isocyanate adducts obtained by using a polyol such as trimethylol propane and the like with a bifunctional isocyanate compound, a formalin condensate of benzene isocyanate, polymers of an isocyanate compound having a polymerizable group such as methacryloyloxyethyl isocyanate and the like, lysin isocyanate and the like.

In particular, trimers (buret or isocyanurate) obtained using as a main raw material xylylene diisocyanate and a hydrate thereof, hexamethylene diisocyanate, tolylene diisocyanate and hydrates thereof, and further, multifunctional isocyanate compounds which are obtained as an adduct with trimethylolpropane. These compounds are described in "Polyurethane Resin Handbook" (K. Iwata ed., published by Daily Industrial Newspaper (1987)).

Among them, adducts of 2,4-tolylene diisocyanate, 2,6-tolylene diisocyanate, xylylene-1,4-diisocyanate, xylylene- 1,3-diisocyanate, trimethylolpropane with xylylene-1,4-diisocyanate or xylylene-1,3-diisocyanate are preferred, and adducts of xylylene-1,4-diisocyanate, xylylene-1,3-diisocyanate, trimethylolpropane with xylylene-1,4-diisocyanate or xylylene-1,3-diisocyanate are particularly preferable.

The molar reaction ratio of the above-described active hydrogen in (A) to the isocyanate group in (B) is preferably from 1/100 to 50/100, and particularly preferably from 2/100 to 40/100. When the molar reaction ratio is less than 1/100, the effect of increase in sensitivity is insufficient, and when exceeds 50/100, amount of the isocyanate group decreases, therefore, encapsulation is difficult.

The addition reaction of the above-described active hydrogen in (A) with the isocyanate group in (B) can be conducted, for example, by heating the both compounds (at from about 50 to 100° C.) in an organic solvent having no active hydrogen with stirring, or by heating the both compounds at a relatively low temperature (from about 40 to 70° C.) with adding a catalyst such as stannous octanoate, stannous dibutyl diacetate and the like.

The examples of the organic solvent include ethyl acetate, chloroform, tetrahydrofuran, methyl ethyl ketone, acetone, acetonitrile, toluene and the like.

The adduct of the compound (A) with the compound (B) may be a single compound or a mixture of two or more.

As a raw material for a microcapsule, known multifunctional isocyanates having two or more isocyanate groups can be used together in addition to the adducts of the compound (A) with the compound (B) of the present invention. As the example of such a multifunctional isocyanate, the compounds exemplified as the above-described compound (B) can also be used together in an appropriate ratio.

These multifunctional isocyanate compounds may be used alone or in combination of two or more. In this case, the ratio of the adduct of the compound (A) with the compound (B) to the multifunctional isocyanate used together is preferably from 100/0 to 10/90 by weight.

The polymerization of these isocyanate compounds can be conducted by reaction with a compound having two or more active hydrogens in the molecule. The examples of these compounds include polyhydric alcohol based compounds such as ethylene glycol, glycerin and the like, multifunctional isocyanate amine compounds such as ethylenediamine, diethylenetriamine and the like, and a mixture of these compounds, and the like in addition to water. Among them, water is particularly preferable to carry out polymerization. As a result of this reaction, a polyurethane/polyurea wall is formed.

The diazo compound or the electron donative dye precursor is dissolved in a solvent having a high boiling point and encapsuled in a microcapsule.

The thermo-responsive microcapsule of the present invention is a microcapsule containing a diazo compound or an electron donative dye precursor.

The heat-sensitive recording material of the present invention has a basic structure in which a heat-sensitive recording layer containing the above-described microcapsule is disposed on a substrate.

Further, in the multi-color heat-sensitive recording material of the present invention, heat-sensitive recording layers containing cyan, magenta and yellow color-forming microcapsules are disposed on a transparent substrate, respectively, and at least one of the layers has the above-described basic structure comprising the microcapsule (optionally, a black color-forming heat-sensitive recording layer may be disposed on the reverse surface of the transparent substrate).

The electron donative dye precursor contained in the microcapsule of the present invention, includes triarylmethane-based compounds, diphenylmethane-based compounds, thiazine-based compounds, xanthene-based compounds, spiropyran-based compounds and the like, and in particular, triarylmethane-based compounds and xanthene-based compounds are useful due to high color developing density.

The specific examples of these compounds include 3,3-bis (p-dimethylaminophenyl) -6 dimethylaminophthalide (namely, crystal violet lactone), 3,3-bis (p-dimethylamino) phthalide, 3-(p-dimethylaminophenyl)-3-(1,3-dimethylindol-3-yl) phthalide, 3-(p-dimethylaminophenyl)-3-(2-methylindol-3-yl)phthalide, 3-(o-methyl-p-dimethylaminophenyl)-3-(2-methylindol-3-yl)phthalide, 3-(o-methyl-p-diethylaminophenyl)-3-(1'-ethyl-2-methylindol-3-yl)phthalide, 4,4'-bis (dimethylamino) benzhydrinbenzyl ether, N-halophenylleuco auramine, N-2,4,5-trichlorophenylleuco auramine, Rhodamine-B-anilinolactam, Rhodamine (p-nitroanilino) lactam, Rhodamine-B-(p-chloroanilino) lactam, 2-benzylamino-6-diethylaminofluoran, 2-anilino-6-diethylaminofluoran, 2-anilino-3-methyl-6-diethylaminofluoran, 2-anilino-3-methyl-6-cyclohexylmethylaminofluoran, 2-anilino-3-methyl-6-isoamylethylaminofluran, 2-(o-chloroanilino)-6-diethylaminofluoran, 2-octylamino-6-diethylaminofluoran, 2-ethoxyethylamino-3-chloro-2-diethylaminofluoran, 2-anilino-3-chloro-6-diethylaminofluoran, benzoylleucomethylene blue, p-nitrobenzylleucomethylene blue, 3-methyl-spiro-dinaphthopyran, 3-ethyl-spiro-dinaphthopyran, 3,3'-dichloro-spyro-dinaphthopyran, 3-benzylpyrodinaphthopyran, 3-propyl-spiro-dibenzopyran, and the like.

As the electron acceptive compound (color developing agent (not contained in microcapsule)) which is used together with the above-described electron donative dye precursor, phenol derivatives, salicylic acid derivatives, hydroxybenzoate, and the like are exemplified. Among them, bisphenols and hydroxybenzoates are preferred. The examples thereof include 2,2-bis (p-hydroxyphenyl) propane (bisphenol A), 2,2-bis (p-hydroxyphenyl) pentane, 2,2-bis (p-hydroxyphenyl) ethane, 2,2-bis (p-hydroxyphenyl) butane, 2,2-bis (4'-hydroxy-3',5'-dichlorophenyl) propane, 1,1-(p-hydroxyphenyl) cyclohexane, 1,1-(p-hydroxyphenyl) propane, 1,1-(p-hydroxyphenyl) pentane, 1,1-(p-hydroxyphenyl)-2-ethylhexane, 3,5-di (α-methylbenzyl) salicylic acid and multifunctional isocyanate metal salts thereof, 3,5-di (tert-butyl) salicylic acid and multifunctional isocyanate metal salts thereof, 3-α,α-dimethylbenzylsalicylic acid and multifunctional isocyanate metal salts thereof, butyl p-hydroxybenzoate, benzyl p-hydroxybenzoate, 2-ethylhexyl p-hydroxybenzoate, p-phenylphenol and p-cumylphenol. In the present invention, these electron acceptive compounds can be used in combination of two or more at any ratio.

It is preferred to add a sensitizer to the heat-sensitive recording layer to accelerate the reaction. As the sensitizer, an organic compound having low melting point containing suitable amounts of an aromatic group and a polar group in the molecule is preferred. The specific examples thereof include benzyl p-benzyloxybenzoate, α-naphthylbenzyl ether, β-naphthylbenzyl ether, phenyl β-naphtoate, phenyl α-hydroxy-β-naphtoate, β-nephtol-(p-chlorobenzyl) ether, 1,4-butanediol phenyl ether, 1,4-butanediol-p-methylphenyl ether, 1,4-butanediol-p-ethylphenyl ether, 1,4-butanediol-m-methylphenyl ether, 1-phenoxy-2-(p-tolyloxy) ethane, 1-phenoxy-2-(p-ethylphenoxy) ethane, 1-phenoxy-2-(p-chlorophenoxy) ethane, p-benzylbiphenyl, p-toluenesulfonamine, 4-(2-ethylhexyloxy) phenylsulfonamide, 4-n-pentyloxyphenylsuofonamide, and the like. In the present invention, these sensitizers can be used in combination of two or more at any ratio.

As the diazonium salt compound contained in the microcapsule of the present invention, known compounds can be used. This diazonium compound indicate the compound represented by the following general formula:

$ArN_2X^-$ (wherein, Ar represents an aryl group, and X represents an acid anion.).

The above-described diazonium salt compound reacts with a phenol compound or a compound having an active methylene group, can form a so-called dye, and further is decomposed by irradiation of light (usually, ultraviolet ray) and loses its reaction activity through denitrogen reaction.

The specific examples of the diazonium salt include salts of 2,5-dibutoxy-4-morpholinobenzene diazonium, 2,5-octoxy-4-morpholinobenzene diazonium, 2,5-dibutoxy-4-(N-(2-ethylhexanoyl) piperazino) benzene diazonium, 2,5-diethoxy-4-(N-(2-(2,4-di-tert-amylphenoxy) butylyl) piperazino) benzene diazonium, 2,5-dibutoxy-4-tolylthiobenzenediazonium, 2,5-dibutoxy-4-chlorobenzenethiodiazonium, 2,5-diheptyloxy-4-chlorobenzenethiodiazonium, 3-(2-octyloxyethoxy)-4-morpholinobenzene diazonium, 4-N,N-dihexylamino-2-hexyloxybenzene diazonium, 4-(N-hexyl-N-(1-methyl-2-(p-methoxyphenoxy) ethyl) amino) -2-hexyloxybenzene diazonium and 4-N-hexyl-N-tolylamino-2-hexyloxybenzene diazonium.

As the acid anion of the diazonium salt compound, hexafluoro phosphate salts, tetrafluoro borate salts, 1,5-naphthalene sulfonate salts, perfluoroalkyl carbonate salts, perfluoroalkyl sulfonate salts, zinc chloride, tin chloride and the like can be used. Preferably, hexafluoro phosphate salts, tetrafluoroborate salts and 1,5-naphthalene sulfonate salts are suitable since they are slightly soluble in water and are soluble in an organic solvent. In the present invention, two or more different diazonium salt compounds can be mixed at any ratio for use.

In a heat-sensitive recording layer using a microcapsule containing the diazonium salt compound, a known heat sensitizer such as an arylsulfonamide compound or the like may be added. Specifically, toluenesulfonamide, ethylbenzenesulfonamide and the like are exemplified. In the present invention, two or more different heat sensitizers can be used in admixture.

The coupler which reacts with the diazonium salt compound to form a dye is subjected to emulsifying dispersion and/or solid dispersion to make fine particles for use. The specific examples of the coupler include resorcin, phloroglucin, sodium 2,3-dihydroxynaphthalene-6-sulfonate, 1-hydroxy-2-naphtoic acid morpholinopropyl amide, 1,5-dihydroxynaphthalene, 2,3-dihydroxynaphthalene, 2,3-dihydroxy-6-sulphanylnaphthalene, 2-hydroxy-3-naphtoic acidanilide, 2-hydroxy-3-naphthoic acid ethanolamide, 2-hydroxy-3-naphtoic acid octyl amide, 2-hydroxy-3-naphtoic acid N-dodecyloxypropyl amide, 2-hydroxy-3-naphtoic acid tetradecyl amide, acetanilide, acetacetanilide, benzoylacetanilide, 2-chloro-5-octylacetacetanilide, 2,5-di-n-heptyloxyacetanilide, 1-phenyl-3-methyl-5-pyrazolone, 1-(2'-octylphenyl)-3-metyl-5-pyrazolone, 1-(2',4',6'-trichlorophenyl)-3-benzamide-5-pyrazolone, 1-(2',4',6'-trichlorophenyl)-3-anilino-5-pyrazolone, 1-phenyl-3-phenylacetamide-5-pyrazolone, 1-(2-dodecyloxyphenyl)-2-methylcarbonate cyclohexane-3,5-dione, 1-(2-dodecyloxyphenyl)cyclohexane-3,5-dione, N-phenyl-N-dodecylbarbiturate, N-phenyl-N-(2,5-dioctyloxyphenyl) barbiturate and N-phenyl-N-(3-stearyloxy)butylbarbiturate are listed. These couplers can be used in combination of two or more to obtain a intended color hue.

Further, in order to promote dye-forming reaction, it is general to add fine particles of a basic compound obtained by emulsifying dispersion and/or solid dispersion. The basic substances include a compound which releases an alkaline substance by decomposition and the like when heated, in addition to inorganic or organic basic compounds. Representative examples include organic ammonium salts, organic amines, amides, urea, thiourea and derivatives thereof, and nitrogen-containing compounds such as thiazols, pyrroles, pyrimidines, piperazines, guanidines, indoles, imidazoles, imidazolines, triazoles, morpholines, piperidines, amidines, formazines, pyridines and the like. The specific examples thereof include tricyclohexylamine, tribenzylamine, octadecylbenzylaine, stearylamine, allylurea, thiourea, methylthiourea, allylthiourea, ethylenethiourea, 2-benzylimidazole, 4-phenylimidazole, 2-phenyl-4-methylimidazole, 2-undecylimidazoline, 2,4,5-trifuryl-2-imidazoline, 1,2-diphenyl-4,4-dimethyl-2-imidazoline, 2-phenyl-2-imidazoline, 1,2,3-triphenylguanidine, 1,2-dicylcohexylguanidine, 1,2,3-tricyclohexylguanidine, guanidinetrichloroacetic acid salt, N,N'-dibenzylpiperazine, 4,4'-dithiomorpholine, morpholiniumtrichloroacetic acid salt, 2-aminobenzothiazole and 2-benzoylhydrazinobenzothiazole. These compounds can be used in combination of two or more.

The thermo-responsive microcapsule of the present invention can be made, for example, according to the following method.

As the hydrophobic solvent for forming the core of a microcapsule, an organic solvent having a boiling point from 100 to 300° C. is preferred. The specific examples include alkylnaphthalenes, alkyldiphenylethanes, alkyldiphenylmethanes, diphenylethane alkyl adducts, alkylbiphenyls, clorinated paraffin, phosphate derivatives such as tricresyl phosphate and the like, maleates such as di-2-ethylhexyl maleate and the like, adipates, and the like. These compounds may be used in admixture of two or more. When the solubility of the diazonium salt compound and the electron donative dye precursor in these hydrophobic solvents is not sufficient, a solvent having a low boiling point can further be used together. As the solvent having a low boiling point used together, organic solvents having a boiling point from 40 to 100° C. are preferred, and the specific examples include ethyl acetate, butyl acetate, methylene chloride, tetrahydrofuran, acetone and the like. These may be used in combination of two or more. When only the solvent having a low boiling point (that having a boiling point of not more than about 100° C.) is used for the core of a capsule, a solvent evaporates and a so-called coreless capsule is easily formed in which only a capsule wall, and the diazonium salt compound or the electron donative dye precursor exist.

Depending on the kind of the diazonium salt, the salt sometimes migrates to the water phase in microcapsule forming reaction. To prevent this migration, an acid anion previously may be appropriately added to a water-soluble polymer solution. As the anion, $PF_6^-$, B $(-Ph)_4^-$ [Ph represents a phenyl group], $Z_nC_{12}^-$, $C_nH_{2n+1}COO^-$ (n represents an integer from 1 to 9) and $C_pF_{2p+1}SO_3^-$ (p represents an integer from 1 to 9) are listed.

As the compound having an active hydrogen used for polymerization of an isocyanate compound for forming the wall of a microcapsule when a microcapsule is made in the present invention, waterisusuallyused. However, apolyol-previously added to an organic solvent, which forms a core or to a water-soluble polymer solution which is to be a dispersion medium can be used as the above-described compound having an active hydrogen (one of raw materials for the wall of a microcapsule). Specifically, propylene glycol, glycerin, trimethylolpropane and the like are listed. Also, an amine compound such as diethylenetriamine, tetraethylenepentamine and the like may be used instead of the polyol or in combination. These compound are also described in the above-described "Polyurethane Resin Handbook".

The examples of the water-soluble polymer used for dispersion of the oil phase of a microcapsule into a water phase include polyvinyl alcohol and modified compounds thereof, polyacryl amide and derivatives thereof, ethylene/vinyl acetate copolymer, styrene/maleic anhydride copolymer, ethylene/maleic anhydride copolymer, isobutylene/maleic anhydride copolymer, polyvinylpyrrolidone, ethylene/acrylic acid copolymer, vinyl acetate/acrylic acid copolymer, carboxymethylcellulose, methylcellulose, casein, gelatin, starch derivatives, gum arabic and sodium alginate. It is preferable that these water-soluble polymers do no react or scarcely react with an isocyanate compound, and it is necessary that a compound having a reactive amino group in the molecular chain such as gelatin is deactivated in advance.

In the present invention, though a surfactant may be added to either an oil phase or a water phase for use, the addition to the water phase is easier due to its lower solubility in an organic solvent. The amount of the surfactant to be added is preferably from 0.1 to 5% by weight, particularly from 0.5 to 2% by weight based on the weight of the oil phase. It is generally said that a surfactant having a relatively long chain hydrophobic group is appropriate as the surfactant used for emulsifying dispersion (See: "Surfactant Handbook" (I. Nishi et al., published by Sangyo Tosho K.K. (1980))), and alkali metal salts of alkylsulfonic acid, alkylbenzenesulfonic acid and the like can be used.

In the present invention, compounds such as a formalin condensate of an aromatic sulfonic acid salt, a formalin condensate of a aromatic carboxylic acid salt and the like can be used as the surfactant (emulsifying aid). The specific examples include a compound represented by the following formula:

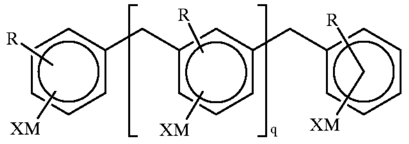

(wherein, R represents an alkyl group having 1 to 4 carbon atoms, X represents $SO_3^-$ or $COO^-$, M represents sodium atom or potassium atom, and q represents an integer from 1 to 20). The above-described compound is described in Japanese Patent Application Laid-Open (JP-A) No. 6-297856.

Also, alkylglucoside compounds can be used likewise. The specific examples include a compound represented by the following formula:

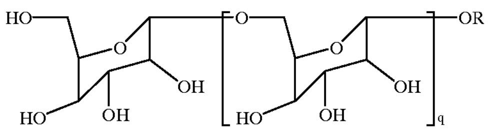

(wherein, R represents analkyl group having 4 to 18 carbon atoms, and q represents an integer from 0 to 2.). In the present invention, the both surfactants may be used alone or may be used suitably in combination of two or more.

A mixed solution (oil phase) of the multifunctional isocyanate compound (adduct) of the present invention with a solution containing the above-described diazonium salt compound (or the electron donative dye precursor) and a solvent having a high boiling point and the like, is added to an aqueous solution (water phase) containing a surfactant and a water-soluble polymer. In this procedure, the addition is carried out with stirring the aqueous solution by a high shear stirring machine such as a homogenizer and the like, to make emulsifying dispersion. After the emulsification, a polymerization reaction catalyst for an isocyanate compound is added or the temperature of the emulsified dispersion is raised to perform capsule wall forming reaction.

A coupling reaction deactivating agent can further be added appropriately to the prepared microcapsule solution containing adiazoniumsalt. Theexamples of this deactivating agent include hydroquinone, sodium bisulfite, potassium nitrite, hypophosphorous acid, stannous chloride and formalin. These compounds are described in Japanese Patent Application Laid-Open (JP-A) No. 60-214992. A diazonium salt compound is often eluted into a water phase in the process of encapsulation in general, and as a method for removing the eluted compound, methods such as filtering processing, ion exchange processing, electrophoresis processing, chromatographic processing, gel filtering processing, reverse osmosis processing, ultrafiltration processing, osmosis processing, active carbon processing and the like are preferred. Among them, ion exchange processing, reverse osmosis processing, ultrafiltration processing and osmosis processing are preferred, and processing using a cation exchanger, and processing using a cation exchanger and an anion exchanger in combination are particularly preferred. These methods are described in Japanese Patent Application Laid-Open (JP-A) No. 61-219688.

In the present invention, an electron acceptive compound, heat sensitizer, coupler, basic compound and the like can be added into a heat-sensitive color forming layer. These compounds can be separately appropriately mixed and can be separately subjected to emulsifying dispersion or solid dispersion and made into fine particles before addition, or can be appropriately mixed and can be subjected to emulsifying dispersion or solid dispersion and made into fine particles before addition to the heat-sensitive color forming layer. For the emulsifying dispersion, these compounds are dissolved into an organic solvent, and the mixture is added to an aqueous water-soluble polymer solution with stirring the aqueous solution by a homogenizer and the like. In order to promote the fine particle formation, the above-described hydrophobic organic solvent, surfactant and water-soluble polymer are preferably used.

In order to carry out solid dispersion of the coupler, basic substance, electron acceptive compound, heat sensitizer and the like, the powders of these compounds are added into an aqueous water-soluble polymer solution and the mixture is made into fine particles for use, using a known dispersing means such as a ball mill and the like.

It is preferable to perform this fine particle forming process so as to obtain a particle diameter which can satisfy characteristics required for a multicolor heat-sensitive recording material and a production method thereof, such as heat-sensitivity, storability, transparency of a recording layer, production aptitude and the like.

The above-described microcapsule solution and the preparation solution of the above-described heat-sensitizer, electron acceptive compound, coupler, basic compound and the like are mixed in a appropriate ratio and applied on a substrate. In general, it is suitable that the coupler is used in an amount from 1 to 10 moles, preferably from 2 to 6 moles per one mole of the diazonium salt compound. Although most suitable amount of addition of the basic compound varies with the strength of basicity, the amount of the basic compound is generally from 0.5 to 5 moles per one mole of the diazonium salt compound. The electron acceptive compound (color developing agent) is usually added in an amount in the range from 0.5 to 30 moles per one mol of the electron donative dye precursor, and preferably appropriately added in an amount in the range from 1 to 20 moles. More preferably, it is added in an amount in the range from 3 to 15 moles. The heat-sensitizer is usually added in an amount in the range from 0.1 to 20 moles based on the electron donative dye precursor, and preferably appropriately added in an amount in the range from 0.5 to 10 moles.

As a substrate on which these coating solutions are applied, materials known as a substrate for heat-sensitive recording materials can be used. Examples thereof include paper, coated paper obtained by coating clay and the like on a paper sheet, laminated paper obtained by laminating polyethylene, polyester and the like on apaper sheet, synthetic paper, and plastic films such as polyethylene terephthalate, polyimide, triacetyl cellulose and the like. Further, as the transparent substrate, the above-described polyethylene terephthalate, triacetyl cellulose, and, plastic films such as polystyrene, polypropylene, polyethylene and the like are exemplified.

In the present invention, a protective layer maybe formed on the heat-sensitive color forming layer to further improve light-fastness and the like. Further, in the multicolor heat-sensitive material, an intermediate layer may be formed between the heat-sensitive recording layers to further improve color reproduction. As a material for the layer used in this heat-sensitive material, the emulsion (latex) of a water-soluble polymer compound or a hydrophobic polymer compound is preferred.

The multicolor heat-sensitive recording material and recording method thereof will be described below.

First, a heat-sensitive layer which is the outermost layer (a first heat-sensitive recording layer, usually yellow color-forming layer) containing a diazonium compound is developed by heat recording using a lower energy, then, the whole surface is irradiated using a light source which emits light in the absorption wavelength range of the diazonium compound contained in the above-described heat-sensitive layer to photo-decompose the diazonium compound remaining in the outermost heat-sensitive layer.

Then, a second heat-sensitive layer (a second heat-sensitive recording layer, usually magenta color forming layer) containing a diazonium compound having the different light absorption wavelength range from the light absorption wavelength range of the diazonium compound contained in the first layer is developed by heat recording using higher energy than first one, then, the whole surface is irradiated again using a light source which emits light in the absorption wavelength range of the diazonium compound to photo-decompose the diazonium compound remaining in the second heat-sensitive layer. Finally, a third layer containing an electron donative dye precursor which is the innermost layer (a third heat-sensitive recording layer, usually cyan color forming layer) is developed by heat recording using further higher energy to complete the image recording.

In the above case, it is preferable that the outermost layer and the second layer are made to be transparent heat-sensitive layers since respective developed colors become clear.

In the present invention, a multicolor image can also be obtained by using a transparent substrate as the substrate and applying one of the above-described three layers on the reverse surface of the transparent substrate. In this case, the outermost heat-sensitive layer opposite to the image viewing side is not required to be transparent.

As the light source used for the photo-decomposition of the above-described diazonium compound, a ultraviolet ray lamp is usually used. The ultraviolet ray lamp is a luminescent tube filled with a mercury vapor in a tube, and luminescent tubes having various emission wavelengths depending on types of luminescent materials coated on the inner wall of the tube can be obtained.

In the multicolor heat-sensitive recording material, the above-described third heat-sensitive recording layer can also be produced by suitable combination of a diazonium salt compound with a coupler compound.

EXAMPLES

The following examples illustrate the present invention but are not to be construed to limit the scope thereof. In the examples, all "parts" are by weight.

Synthesis Example 1

75 parts of polyethylene glycol monomethyl ether (average molecular weight: 5000) was dissolved in 125 parts of dried chloroform, and to the solution was added 7.5 parts of molecular sieves 4A. The mixture was dried for 3 hours under dried nitrogen gas flow. To this was added 100 parts of a multifunctional isocyanate compound (xylylene diisocyanate/trimethylolpropane adduct (Takenate D 110N), 75% by weight ethyl acetate solution, manufactured by Takeda Chemical Industries, Ltd.). Inawater bath, 160 mg of stannous octanoate (Stannoct, manufactured by Yoshitomi Pharmaceutical Industries, Ltd.) was added to the mixture. The resulting mixture was stirred for 1 hour at room temperature, then stirred for 3 hours at 50° C. In this way, a solution (50% by weight) of an isocyanate compound (1) was obtained.

Synthesis Example 2

A solution (50% by weight) of isocyanate compound (2) was obtained in the same manner as in Synthesis Example 1 except that polyethylene glycol monomethyl ether (average molecular weight: 5000) in Synthesis Example 1 was changed to polyethylene glycol monomethyl ether (average molecular weight: 2000).

Synthesis Example 3

A solution (50% by weight) of isocyanate compound (3) was obtained in the same manner as in Synthesis Example 1 except that polyethylene glycol monomethyl ether (average molecular weight: 5000) in Synthesis Example iwas changed topolyethylene glycol monomethyl ether (manufactured by NOF Corp. (Nippon Oil & Fats Co., Ltd.), Uniox M-4000, average molecular weight: 4000) and dried chloroform was changed to dried acetonitrile.

Synthesis Example 4

A solution (50% by weight) of isocyanate compound (4) was obtained in the same manner as in Synthesis Example 3 except that the amount of polyethylene glycol monomethyl ether (manufactured by NOF Corp. (Nippon Oil & Fats Co., Ltd.), Uniox M-4000, average molecular weight: 4000) in Synthesis Example 3 was changed from 75 parts to 70 parts, the amount of dried acetonitrile was changed from 125 parts to 70 parts and the amount of xylylene diisocyanate/ trimethylolpropane adduct (Takenate D 110 N, 75% by weight ethyl acetate solution, manufactured by Takeda Chemical Industries, Ltd.) was changed from 100 parts to 80 parts, respectively.

Synthesis Example 5

A solution (50% by weight) of isocyanate compound (5) was obtained in the same manner as in Synthesis Example 2 except that the amount of polyethylene glycol monomethyl ether (average molecular weight: 2000) in Synthesis Example 2 was changed from 75 parts to 30 parts and the amount of dried chloroform was changed from 125 parts to 80 parts.

Synthesis Example 6

A solution (50% by weight) of isocyanate compound (6) was obtained in the same manner as in Synthesis Example 1 except that polyethylene glycol monomethyl ether (average molecular weight: 5000) in Synthesis Example 1 was changed topolyethylene glycol monononylphenyl ether (average molecular weight: 3000) and dried chloroform was changed to dried acetonitrile.

Synthesis Example 7

A solution (50% by weight) of isocyanate compound (7) was obtained in the same manner as in Synthesis Example 1 except that polyethylene glycol monomethyl ether (average molecular weight: 5000) in Synthesis Example 1 was changed to polyethylene glycol monostearate (average molecular weight: 3000) and dried chloroform was changed to dried acetonitrile.

Synthesis Example 8

2.5 parts of n-butyl alcohol and 100 parts of a multifunctional isocyanate compound (xylylene diisocyanate/ trimethylolpropane adduct (Takenate D 110 N, 75% by weight ethyl acetate solution, manufactured by Takeda Chemical Industries, Ltd.) were dissolved in 52.5 parts of ethyl acetate. Inawater bath, 80 mg of stannous octanoate (Stannoct, manufactured by Yoshitomi Pharmaceutical Industries, Ltd.) was added to the mixture. The resulting mixture was stirred for 1 hour at room temperature, then stirred for 3 hours at 50° C. In this way, a solution (50% by weight) of isocyanate compound (8) was obtained.

Example 1

(I) Preparation of coating solution for heat-sensitive recording layer (A)

(1) Preparation of capsule solution of diazonium salt compound 0.9 parts of compound (A-2) and 3.5 parts of compound (A-1) described below having the maximum absorption wavelength for decomposition at 420 nm as a diazonium salt compound were dissolved in 16.4 parts of ethyl acetate, and to this were further added 7.3 parts of isopropylbiphenyl and 2.5 parts of dibutyl phthalate asa high boiling point solvent, and theywere heated and mixed uniformly.

A-1

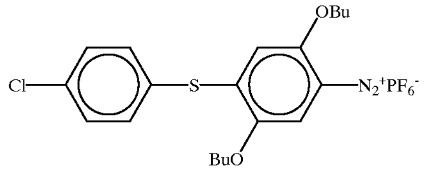

A-2

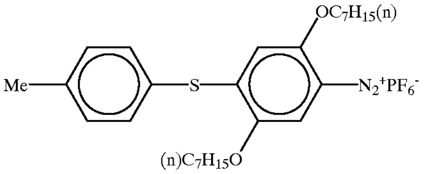

To the above-described mixture was added 4.5 parts of the isocyanate compound (1) described in Synthesis Example 1 per 4.3 parts of a mixture of 4.5 parts of xylylene diisocyanate/trimethylolpropane adduct (Takenate D 110 N, 75% by weight ethyl acetate solution, manufactured by Takeda Chemical Industries, Ltd.) and 4.5parts of a 30% byweight ethyl acetate solution of a xylylene diisocyanate/ bisphenol A adduct synthesized according to the method described in Japanese Patent Application Laid-Open (JP-A) No. 7-088356, as capsule wall materials, and the mixture was stirred uniformly. Separately, 77 parts of a 6% by weight aqueous gelatin solution to which 0.36 parts of Scraph AG-8 (manufactured by Nippon Fine Chemical Co., Ltd.) had been added was prepared, and to this was added the above-described mixture (solution) of the diazonium salt compounds, and the mixture was emulsified and dispersed by a homogenizer. To the resulting emulsified solution was added 20 parts of water and mixed to obtain a uniform solution, then, capsule forming reaction was conducted for 3 hours with stirring at 40° C. Then, the temperature of the solution was lowered to 35° C., and to this were added 6.5 parts of an ion exchanging resin Amberlite IRA68 (manufactured by Organo K.K.) and 13 parts of Amberlite IRC 50 (manufactured by Organo K.K.), and the mixture was stirred for further 1 hour. Then, the ion exchanging resin was filtered off, and a 1% by weight hydroquinone aqueous solution was added in an amount of 0.4 parts per 10 parts of the capsule solution, and the mixture was stirred. In this way, a capsule solution of the diazonium compound was obtained. The average particle size of the capsule was 0.8 $\mu$m.

(2) Preparation of coupler emulsified dispersion

As a coupler, 2.4 parts of 2,5-di-n-heptyloxylacetanilide, 2.5 parts of triphenylguanidine, 3.3 parts of 4-(2-ethylhexyloxy) phenylsulfonamide, 1.7 parts of 4-n-pentyloxyphenylsulfonamide and 5.0 parts of 4,4'-(m-phenylenediisopropylidene) diphenol were dissolved in 8.0 parts of ethyl acetate. To this mixture was added 1.0 part of Pionin A41C. (manufactured by Takemoto Yushi K.K.), then the mixture was heated and mixed uniformly. This mixture was added into 75.0 parts of a separately prepared 10% by weight aqueous gelatin (#750 gelatin, manufactured by Nitta Gelatin K.K.) solution, and the mixture was emulsified and dispersed by a homogenizer. The remaining ethyl acetate was evaporated from this emulsified solution to obtain an intended emulsified dispersion.

(3) Preparation of coating solution

The above-described diazonium salt compound capsule solution, a coupler emulsified dispersion and a styrene/butadiene rubber (trade name SBR-SN307, manufactured by Sumitomo Norgatack K.K.) were mixed so that the ratio of diazonium compound/coupler was 1/3.2 and the weight of styrene-butadiene rubber was the same as the weight of gelatin in the coating solution, to obtain a desired coating solution.

(II) Preparation of coating solution of protective layer (D) for the heat-sensitive layer.

To 61 parts of a 5.0% by weight itaconic acid-modified polyvinyl alcohol (KL-318, manufactured by Kuraray Co., Ltd.) aqueous solution was added 2.0 part by weight of a 20.5% by weight zinc stearate dispersion (Hydrin F115, manufactured by Chukyo Yushi K.K.), and 8.4 parts of the 2% by weight aqueous solution of a compound shown below (D-1), 8.0 parts of a fluorine-based releasing agent (ME-313, manufactured by Daikin Industries, Ltd.) and 0.5 parts of a wheat flour starch (KF-4, manufactured by Kagoshima Denpun K.K.) were added and the resulting mixture was stirred uniformly. The resulted solution was called a mother solution.

D-1

$$C_{12}H_{25}O—(C_2H_4O)_{10}—H$$

Separately, 12.5 parts of a 20% by weight Kaogloss (manufactured by Shiraishi Industries K.K.) aqueous solution which had been subjected to ion-exchanging, 0.06 parts of Poise 532A (manufactured by Kao Corp.). 1.87 parts of Hydrin Z-7 (manufactured by Chukyo Yushi K.K.), 1.25 parts of a 10% by weight polyvinyl alcohol (PVA105, manufactured by Kuraray Co., Ltd.) aqueous solution, and 0.39 parts of a 2% by weight sodium dodecylsuofonate aqueous solution were mixed, and the mixture was finely dispersed by a Dinau mill. This solution was called a pigment solution.

To 80 parts of the above-described mother solution was added 4.4 parts of the pigment solution, and the mixture was stirred for 30 minutes or more. Then, 2.8 parts of Wetmaster500 (manufactured by Toho Chemical Industry Co., Ltd.) was added, and the mixture was further stirred for 30 minutes or more to obtain an intended coating solution of a protective layer (D) for the heat-sensitive layer.

(III) Coating

The heat-sensitive recording layer (A) and the protective layer (D) were coated by a wire bar in this order on the surface of a substrate for photographic printing paper laminated with polyethylene on high quality paper, and the coated paper was dried to obtain an intended heat-sensitive recording material. The coated amounts as solid components were 4.5 g and 1 g respectively per 1 $m^2$.

(IV) Heat recording

The heat recording property of the above-described heat-sensitive recording material was evaluated as described below using a thermal head KST type (manufactured by Kyocera Corp.).

(1) The electric power applied to the thermal head and the pulse width were controlled so that the recording energy per unit area was 34 $mJ/mm^2$, and printing was conducted on the above-described heat-sensitive recording material to record a yellow image.

(2) This recording material was irradiated using a ultraviolet lamp having an emission central wavelength of 420 nm and an output of 40 W for 10 seconds to fix non-printed areas. Regarding the color density of the yellow image, the optical reflection density of a developed area was measured using Macbeth densitometer (RD918 type). The results are shown in Table 1 as developing density.

(3) Regarding the evaluation of shelf life (storability before use), the resulting heat-sensitive recording material was preserved in a thermo-hygrostat kept at a temperature of 40° C. and a relative humidity of 90% for 24 hours, then the non-printed area was fixed, and the optical reflection density of the ground was measured. The results are described in Table-1 as fog density.

Example 2

A heat-sensitive recording material was made in the same manner as in Example 1 except that isocyanate compound (3) descried in Synthesis Example 3 was used instead of isocyanate compound (1) described in Synthesis Example 1 as the capsule wall material in the preparation of the capsule solution described in Example 1. The average particle size of the capsule was 0.9 μm.

Example 3

A heat-sensitive recording material was made in the same manner as in Example 1 except that isocyanate compound (4) descried in Synthesis Example 4 was used instead of isocyanate compound (1) described in Synthesis Example 1 as the capsule wall material in the preparation of the capsule solution described in Example 1. The average particle size of the capsule was 0.9 μm.

Example 4

A heat-sensitive recording material was made in the same manner as in Example 1 except that isocyanate compound (7) descried in Synthesis Example 7 was used instead of isocyanate compound (1) described in Synthesis Example 1 as the capsule wall material in the preparation of the capsule solution described in Example 1. The average particle size of the capsule was 1.6 μm.

Example 5

An emulsified dispersion was made in the same manner as in Example 1 except that the coupler emulsified dispersion was prepared by dissolving 2. 4 parts of 2,5-di-n-heptyloxyacetanilide and 1.2 parts of triphenylguanidine, and 2.4 parts of 4,4'-(m-phenylenediisopropylidene) diphenol in 8.0 parts of ethyl acetate, and the mixture was heated and mixed uniformly, and aheat-sensitive recording material was obtained. The coating amount of the heat-sensitive recording layer as a solid component was 3.2 g per 1 $m^2$.

Example 6

A heat-sensitive recording material was made in the same manner as in Example 1 except that isocyanate compound (2) described in Synthesis Example 2 was used instead of isocyanate compound (1) described in Synthesis Example 1 as the capsule wall material in the preparation of the capsule solution described in Example 1 and the coupler emulsified dispersion used in Example 5 was used as the coupler emulsified dispersion. The average particle size of the capsule was 0.7 μm.

Example 7

A heat-sensitive recording material was made in the same manner as in Example 2 except that the coupler emulsified dispersion used in Example 5 was used as the coupler emulsified dispersion in Example 2.

Example 8

A heat-sensitive recording material was made in the same manner as in Example 1 except that isocyanate compound (5) described in Synthesis Example 5 was used instead of isocyanate compound (1) described in Synthesis Example 1 as the capsule wall material in the preparation of the capsule solution described in Example 1 and the coupler emulsified dispersion used in Example 5 was used as the coupler emulsified dispersion. The average particle size of the capsule was 1.2 μm.

Example 9

A heat-sensitive recording material was made in the same manner as in Example 1 except that isocyanate compound (6) described in Synthesis Example 6 was used instead of isocyanate compound (1) described in Synthesis Example 1 as the capsule wall material in the preparation of the capsule solution described in Example 1 and the coupler emulsified dispersion used in Example 5 was used as the coupler emulsified dispersion. The average particle size of the capsule was 1.5 μm.

Example 10

A heat-sensitive recording material was made in the same manner as in Example 4 except that the coupler emulsified dispersion used in Example 5 was used as the coupler emulsified dispersion.

Example 11

A capsule solution was made in the same manner as in Example 1 except that 6.5 parts of a mixture of 4.5 parts of xylylene diisocyanate/trimethylolpropane adduct (Takenate D 110 N, 75% by weight ethyl acetate solution, manufactured by Takeda Chemical Industries, Ltd.) and 4.5 parts of a 30% by weight ethyl acetate solution of xylylene diisocyanate/bisphenol A adduct synthesized according to the method described in Japanese Patent Application No. 5-233536, and 2.3 parts of the isocyanate compound (1) described in Synthesis Example 1 were used as the capsule wall material in the preparation of the capsule solution described in Example 1. The average particle size of the capsule was 0.7 μm. A heat-sensitive recording material was made in the same manner except that this capsule solution and the coupler emulsified dispersion used in Example 5 were used.

Example 12

A capsule solution was made in the same manner as in Example 11 except that 1.3 parts of a mixture of 4.5 parts of xylylene diisocyanate/trimethylolpropane adduct (Takenate D 110 N, 75% by weight ethyl acetate solution, manufactured by Takeda Chemical Industries, Ltd.) and 4.5 parts of a 30% by weight ethyl acetate solution of xylylene diisocyanate/bisphenol A adduct synthesized according to the method described in Japanese Patent Application No. 5-233536, and 7.8 parts of isocyanate compound (1) described in Synthesis Example 1 were used as the capsule wall material in the preparation of the capsule solution described in Example 11. The average particle size of the capsule was 1.5 μm. A heat-sensitive recording material was made in the same manner except that this capsule solution and the coupler emulsified dispersion used in Example 5 were used.

Comparative Example 1

A capsule solution was made in the same manner as in Example 1 except that 8.6 parts of a mixture of 4.5 parts of xylylene diisocyanate/trimethylolpropane adduct (Takenate D 110 N, 75% by weight ethyl acetate solution, manufactured by Takeda Chemical Industries, Ltd.) and 4.5 parts of a 30% by weight ethyl acetate solution of xylylene diisocyanate/bisphenol A adduct synthesized according to the method described in Japanese Patent Application No. 5-233536 was used and isocyanate compound (1) described in Synthesis Example 1 was not used as the capsule wall material in the preparation of the capsule solution described in Example 1. The average particle size of the capsule was 1.0 μm. A heat-sensitive recording material was made in the same manner as in Example 1 using this capsule solution.

Comparative Example 2

A heat-sensitive recording material was made in the same manner as in Example 1 except that 9.0 parts of the isocyanate compound (8) described in Synthesis Example 8 instead of a mixture of 4.5 parts of xylylene diisocyanate/trimethylolpropane adduct (Takenate D 110 N, 75% by weight ethyl acetate solution, manufactured by Takeda Chemical Industries, Ltd.) and4.5parts of a 30% byweight ethyl acetate solution of xylylene diisocyanate/bisphenol A adduct synthesized according to the method described in Japanese Patent Application No. 5-233536 as the capsule wall material described in Comparative Example 1. The average particle size of the capsule was 1.1 μm.

(Comparative Example 3

A heat-sensitive recording material was made in the same manner as in Example 1 except that the capsule solution described in Comparative Example 1 was used and the coupler emulsified dispersion described in Example 5 was used.

Comparative Example 4

A heat-sensitive recording material was made in the same manner as in Example 1 except that the capsule solution described in Comparative Example 2 was used and the coupler emulsified dispersion described in Example 5 was used.

The color density and the density of a non-developed area were measured in the same manner as in the thermal recording in Example 1 also regarding the heat-sensitive recording materials obtained above Examples 2 to 12 and Comparative Examples 1 to 4). The results are shown in Table 1 and Table 2.

TABLE 1

| | color density | fog density |
|---|---|---|
| Example 1 | 0.90 | 0.14 |
| Example 2 | 0.90 | 0.12 |
| Example 3 | 0.90 | 0.12 |
| Example 4 | 0.80 | 0.14 |
| Comparative Example 1 | 0.60 | 0.13 |
| Comparative Example 2 | 0.53 | 0.13 |

TABLE 2

| | color density | fog density |
|---|---|---|
| Example 5 | 0.70 | 0.12 |
| Example 6 | 0.64 | 0.16 |
| Example 7 | 0.80 | 0.12 |
| Example 8 | 0.50 | 0.10 |
| Example 9 | 0.75 | 0.15 |
| Example 10 | 0.65 | 0.15 |
| Example 11 | 0.70 | 0.12 |
| Example 12 | 0.75 | 0.16 |
| Comparative Example 3 | 0.20 | 0.12 |
| Comparative Example 4 | 0.15 | 0.12 |

Example 13

(I) Preparation of coating solution for heat-sensitive recording layer (B)

2.8 parts of a compound (B-1) described below having the maximum absorption wavelength for decomposition at 365 nm as adiazonium salt compound, 2.8 parts of dibutyl sulfate and 0.56 partsof 2,2-dimethoxy-1,2-diphenylethane-1-one (Irgacure651, manufactured by Chiba Geigy Corp.) were dissolved in 10.0 parts of ethyl acetate. To this mixture were added 5.9 parts of isopropylbiphenyl and 2.5 parts of tricresyl phosphate as high boiling point solvents, and the mixture was heated and mixed uniformly.

B-1

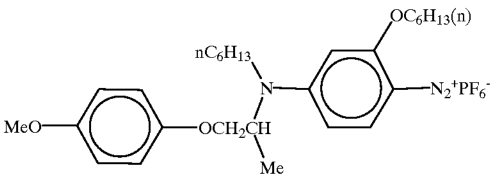

To the above-described mixture was further added 7.6 parts of xylylene diisocyanate/trimethylolpropane adduct (Takenate D 110 N, 75% by weight ethyl acetate solution, manufactured by Takeda Chemical Industries, Ltd.) as a capsule wall material, and the mixture was stirred uniformly. Separately, 64 parts of a 6% by weight gelatin (trade name: MGP-9066, manufactured by Nippi Gelatin Industries K.K.) aqueous solution to which 2.0 parts of a 10% by weight sodium dodecylsulfonate aqueous solution had been added was prepared. To this was added the above-described mixture of the diazonium salt compound, and the mixture was emulsified and dispersed by a homogenizer.

(3) Capsule forming reaction

To the resulting emulsified solution was added 20 parts of water and mixed to obtain a uniform solution, then, the reaction was conducted for 30 minutes at 40° C. with stirring, then, the temperature was raised to 60° C. and capsule forming reaction was conducted for 3 hours. Then, the temperature of the mixture was lowered to 35° C. To this mixture were added 6.5 parts of an ion exchange resin, Amberlite IRA68 (manufactured by Organo K.K.) and 13 parts of Amberlite IRC 50 (manufactured by Organo K.K.), and the mixture was stirred for further 1 hour. Then, the ion exchange resin was filtered off to obtain an intended capsule solution. The average particle size of the capsule was 0.64 μm.

(4) Preparation of coupler emulsified dispersion

As a coupler, 3.0 parts of a compound (B-2) described below, 8.0 parts of triphenylguanidine, 8.0 parts of 1,1-(p-hydroxyphenyl)-2-ethylhexane, 8.0 parts of 4,4'-(p-phenylenediisopropylidene) diphenol, 2.0 parts of a compound (B-3) described below and 2.0 parts of 1,1,3-tris (2-methyl-4-hydroxy-5-t-butylphenyl) butane were dissolved in 10.5 parts of ethyl acetate, to this were further added 0.48 parts of tricresyl phosphate, 0.24 parts of diethyl maleate and 1.27 parts of Pionin A41C (manufactured by Takemoto Yushi K.K.) as high boiling point solvents, then the mixture was heated and mixed uniformly. This mixture was added into 93.0 parts of a 8% by weight gelatin (#750 gelatin, manufactured by Nitta gelatin K.K.) aqueous solution, and the mixture was emulsified and dispersed by a homogenizer. The remaining ethyl acetate was evaporated from this emulsified solution to obtain an intended emulsified dispersion.

B-2

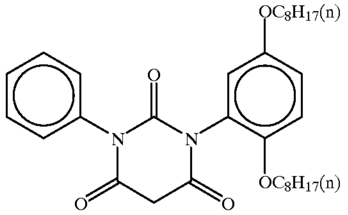

B-3

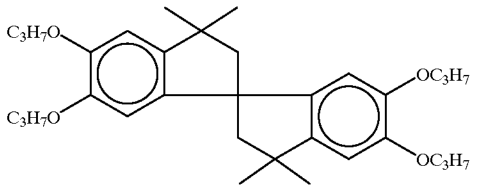

(Preparation of coating solution of heat-sensitive recording layer (C))

(4) Preparation of electron donative dye precursor capsule emulsified solution 0.39 parts of 3-(o-methyl-p-diethylaminophenyl)-3-(1'-ethyl-2-methylindole-3-yl)phthalide as an electron donative dye precursor, 0.19 parts of 2-hydroxy-4-methoxybenzophenone having the maximum absorption wavelength at 285 nm as an ultraviolet ray absorbing agent and 0.29 parts of 2,5-tert-octylhydroquinone as an antioxidant were dissolved in 0.93 parts of ethyl acetate, and 0.54 parts of phenetylcumene as a high boiling point solvent was further added and the resulting mixture was heated and mixed uniformly. 1.0 parts of xylylene diisocyanate/trimethylolpropane adduct (Takenate D 110 N) as a capsule wall material was further added to this solution, and the mixture was stirred uniformly. separately, 36.4 parts of a 6% by weight gelatin (MGP-9066, manufactured by Nippi Gelatin Industries K.K.) aqueous solution to which 0.07 parts of a 10% sodium dodecylsulfonate aqueous solution had been added was prepared. To this solution was added the above-described electron donative dye precursor solution, and the mixture was emulsified and dispersed by a homogenizer. Thus obtained emulsified dispersion is called a primary emulsified dispersion.

Separately, 6.0 parts of 3-(o-methyl-p-diethylaminophenyl)-3-(1'-ethyl-2-methylindole-3-yl) phthalide, 3.0 parts of 2-hydroxy-4-methoxybenzophenone and 4.4 parts of 2,5-tert-octylhydroquinone were dissolved in 14.4 parts of ethyl acetate, and 8.4 parts of phenetylcumene as a high boiling point solvent was further added and the resulting mixture was stirred uniformly. To this solution were added 7.8 parts of Takenate D 110 N and 5.9 parts of methylene diisocyanate (Millionate MR200, manufactured by Nippon Polyurethane K.K.) and the mixturewasstirreduniformly. Thus obtained solution and 1.2 parts of a 10% sodium dodecylsulfonate aqueous solution were added to the above-described primary emulsified dispersion, and the mixture was emulsified and dispersed by a homogenizer. Thus obtained solution is called a secondary emulsified dispersion.

To this secondary emulsified dispersion were added 60.0 parts of water and 0.4 parts of diethylenetriamine and the mixture was stirred uniformly, then the temperature was raised to 65° C. with stirring, and capsule forming reaction was conducted for 3.5 hours to obtain an intended capsule emulsified solution. The average particle size of the capsule was 1.9 $\mu$m.

(5) Preparation of electron acceptive compound dispersion 30 parts of bisphenol P as an electron acceptive compound was added to 82.5 parts of a 2.0% by weight gelatin (MGP-9066, manufactured by Nippi Gelatin Industries K.K.) aqueous solution, and 7.5 parts of a 2% by weight sodium 2-ethylhexylsulfosuccinate aqueous solution was further added, and the resulting mixture was dispersed for 24 hours in a ball mill topreparea dispersion. To this dispersionwas added 36.0 parts of a 15% by weight of gelatin (#750 gelatin, manufactured by Nitta gelatin K.K.) aqueous solution, and the mixture was stirred uniformly to obtain an electron acceptive compound dispersion. The average particle size of the electron acceptive compound in the dispersion was 0.5 $\mu$m.

(6) Preparation of coating solution

Then, the above-described electron donative dye precursor capsule solution, the electron acceptive compound dispersion, 15% by weight gelatin (#750 gelatin, manufactured by Nitta gelatin K.K.) aqueous solution and a stilbene-based fluorescent brightener (Whitex-BB, manufactured by Sumitomo Chemical Co., Ltd.) were mixed so that the ratio of the electron donative dye precursor/the electron acceptive compound is 1/14, the ratio of the electron donative dye precursor/#750 gelatin is 1.1/1, and the ratio of the electron donative dye precursor/the fluorescent brightener is 5.3/1, to prepare an intended coating solution.

(7) Preparation of coating solution for intermediate layer (E)

To a 14% by weight gelatin (#750 gelatin, manufactured by Nitta gelatin K.K.) aqueous solution were added 8.2 parts of a 4% by weight of a boric acid aqueous solution, 1.2 parts of a 2% by weight sodium (4-nonylphenoxytrioxyethylene) butylsulfonate aqueous solution and 7.5 parts of a 2% by weight aqueous solution of the following compound E-1), and the mixture was stirred uniformly to obtain an intended coating solution.

E-1

$$(CH_3CH_2SO_2CH_2CONHCH_2)_2$$

(8) Coating

The above-described heat-sensitive recording layer (c) intermediate layer (E), heat-sensitive recording layer (B), intermediate layer (E), heat-sensitive recording layer (A) described in Example 1 and protective layer (D) were coated by a wire bar in this order onto the surface of a substrate for photographic printing paper laminated with polyethylene on high quality paper. The obtained paper was dried to obtain an intended multicolor heat-sensitive recording material. The coated amounts as solid components for the layers were 9 g, 3 g, 8 g, 3 g, 4.5 g and 1 g, per 1 $m^2$, respectively.

(9) Heat recording

The heat recording property of the above-described heat-sensitive recording material was evaluated as described below using thermal head KST type (manufactured by Kyocera Corp.).

(1) The electric power and the pulse width applied to the thermal head were controlled so that the recording energy per unit area was 35 $mJ/mm^2$, and printing was conducted on the above-described heat-sensitive recording material to record a yellow image.

(2) This recording material was irradiated using an ultraviolet lamp having an emission central wavelength of 420 nm and an output of 40 W for 10 seconds, and (3) the electric power and the pulse width applied to the thermal head were controlled so that the recording energy per unit area was 80 $mJ/mm^2$ and printing was conducted to record a magenta image.

(4) This recording material was further irradiated using an ultraviolet lamp having an emission central wavelength of 365 nm and an output of 40 W for 15 seconds, and (5) the electric power and the pulse width applied to the thermal head were controlled so that the recording energy per unit area was 140 $mJ/mm^2$ and printing was conducted to record a cyan image.

As a result, in addition to respective color images of yellow, magenta and cyan, a recorded area where yellow and magenta overlap formed red color, a recorded area where magenta and cyan overlap formed blue color, a recorded area where yellow and cyan overlap formed green color, and a recorded area where yellow, magenta and cyan overlap formed black color. The color of the non-recorded area was gray-white.

The optical reflection densities of the respective color developed areas of yellow, magenta and cyan were measured by Macbeth RD918 densitometer.

Regarding the evaluation of shelf life (storability before use), the resultant multicolor heat-sensitive recording material was preserved in a thermo-hygrostat kept at a temperature of 40° C. and a relative humidity of 90% for 24 hours, then fixed, and the optical reflection density of the ground was measured.

Example 14

A multicolor heat-sensitive recording material was made in the same manner as in Example 13 except that the diazonium salt compound capsule solution described in Example 2 was used as the diazonium salt compound capsule solution used in the heat-sensitive color recording layer (A) in Example 13.

The color density and the density of a non-developed area of the heat-sensitive recording materials obtained above were measured in the same manner as in the thermal recording in Example 13. The results are shown in Table 3.

TABLE 3

| | color density of printed area | | after fixing of non-printed area | |
|---|---|---|---|---|
| | yellow | magenta | cyan | color density (yellow) |
| Example 13 | 0.90 | 1.00 | 1.20 | 0.12 |
| Example 14 | 0.90 | 0.95 | 1.20 | 0.12 |

The thermo-responsive microcapsule of the present invention has excellent properties that it is highly sensitive to heat, manifests high color forming ability by bringing it into contact with a coupler or a color developing agent, and when a diazo compound is used as a core material, manifests excellent storability before use (long shelf life). Further, even if a heat sensitizer is used in small amount or is not used, sufficient color forming property can be obtained.

Therefore, when the above-described microcapsule is used in the heat-sensitive recording layer of a heat-sensitive recording material, there can be obtained a recording material a high sensitivity and color forming property, and excellent storability before use when a diazo compound is used. Further, when the above-described microcapsule is used in a heat-sensitive recording layer, there can be obtained a multicolor heat-sensitive recording material which has ahigh sensitivity, and is excellent in color reproducing ability and storability before use.

What is claimed is:

1. A thermo-responsive microcapsule containing a diazo compound or an electron donative dye precursor, wherein the capsule wall of said microcapsule is composed of at least one polymer obtained by polymerization of an isocyanate compound containing an adduct of (A) a compound having one active hydrogen in the molecule and having an average molecular weight from 500 to 20000 and (B) a multifunctional isocyanate having two or more isocyanate groups in the molecule.

2. The thermo-responsive microcapsule according to claim 1, wherein said compound (A) is a compound containing at least one of a polyether chain, polyester chain and polymer chain obtained by polymerization of vinyl monomer.

3. The thermo-responsive microcapsule according to claim 1, wherein said compound (A) is a compound having a melting point from 40 to 180° C.

4. The thermo-responsive microcapsule according to claim 2, wherein said compound (A) is a compound having amelting point from 40 to 180° C.

5. The thermo-responsive microcapsule according to claim 2, wherein said compound (A) is polyethylene oxide having a hydroxyl group at one end.

6. The thermo-responsive microcapsule according to claim 3, wherein said compound (A) is polyethylene oxide having a hydroxyl group at one end.

7. The thermo-responsive microcapsule according to claim 4, wherein said compound (A) is polyethylene oxide having a hydroxyl group at one end.

8. A heat-sensitive recording material comprising a substrate and a heat-sensitive recording layer disposed on the substrate including a coupler and a microcapsule containing a diazo compound, or a color developing agent and a microcapsule containing an electron donative dye precursor, wherein the capsule wall of said microcapsule is composed of at least one polymer obtained by polymerization of an isocyanate compound containing an adduct of (A) a compound having one active hydrogen in the molecule and having an average molecular weight from 500 to 20000 and (B) a multifunctional isocyanate having two or more isocyanate groups in the molecule.

9. The heat-sensitive recording material according to claim 8, wherein said compound (A) is a compound containing at least one of a polyether chain, polyester chain and polymer chain obtained by polymerization of vinyl monomer.

10. The heat-sensitive recording material according to claim 8, wherein said compound (A) is a compound having amelting point from 40 to 180° C.

11. The heat-sensitive recording material according to claim 9, wherein said compound (A) is a compound having a melting point from 40 to 180° C.

12. The heat-sensitive recording material according to claim 9, wherein said compound (A) is polyethylene oxide having a hydroxyl group at one end.

13. The heat-sensitive recording material according to claim 10, wherein said compound (A) is polyethylene oxide having a hydroxyl group at one end.

14. The heat-sensitive recording material according to claim 11, wherein said compound (A) is polyethylene oxide having a hydroxyl group at one end.

15. A multicolor heat-sensitive recording material comprising a transparent substrate and heat-sensitive recording layers capable of forming cyan, magenta and yellow colors disposed on the substrate, wherein each recording layer includes a coupler and a microcapsule containing a diazo compound, or a color developing agent and a microcapsule containing an electron donative dye precursor, wherein the capsule wall of said microcapsule is composed of at least one polymer obtained by polymerization of an isocyanate compound containing an adduct of (A) a compound having one active hydrogen in the molecule and having an average molecular weight from 500 to 20000 and (B) a multifunctional isocyanate having two or more isocyanate groups in the molecule.

16. The multicolor heat-sensitive recording material according to claim 15, wherein said compound (A) is a compound containing at least one of a polyether chain, polyester chain and polymer chain obtained by polymerization of vinyl monomer.

17. The multicolor heat-sensitive recording material according to claim 16, wherein said compound (A) is a compound having a melting point from 40 to 180° C.

18. The multicolor heat-sensitive recording material according to claim 15, wherein said compound (A) is polyethylene oxide having a hydroxyl group at one end.

19. The multicolor heat-sensitive recording material according to claim 16, wherein said compound (A) is polyethylene oxide having a hydroxyl group at one end.

20. The multicolor heat-sensitive recording material according to claim 17, wherein said compound (A) is polyethylene oxide having a hydroxyl group at one end.

* * * * *

UNITED STATES PATENT AND TRADEMARK OFFICE

CERTIFICATE OF CORRECTION

PATENT NO. : 5,916,680

DATED : June 29, 1999

INVENTOR(S) : Wakata, Yuichi, Ichikawa, Kimio

It is certified that error appears in the above-identified patent and that said Letters Patent is hereby corrected as shown below:

On the title page: Item [56]

FOREIGN PATENT DOCUMENTS:

7-88356 04/04/95 Japan BO1J 13/16
9-39389 02/10/97 Japan B41M 5/26
2-141279 05/30/90 Japan B41M 5/26
6-55546 07/27/94 Japan B41M 5/26
5-317694 12/3/93 Japan B01J 13/16
4-261893 09/17/92 Japan B41M 5/28
62-212190 09/18/87 Japan B41M 5/18

Signed and Sealed this

Twenty-ninth Day of February, 2000

Attest:

Q. TODD DICKINSON

Attesting Officer

*Commissioner of Patents and Trademarks*